United States Patent [19]

Windle et al.

[11] 4,339,042
[45] Jul. 13, 1982

[54] TREATMENT OF MINERALS

[75] Inventors: William Windle; Charles H. Lofthouse, both of St. Austell; Howard L. Shergold, Farnborough, all of England

[73] Assignee: English Clays Lovering Pochin & Company, Ltd., Cornwall, England

[21] Appl. No.: 16,158

[22] Filed: Feb. 28, 1979

Related U.S. Application Data

[63] Continuation of Ser. No. 875,382, Feb. 6, 1978, abandoned, which is a continuation of Ser. No. 754,952, Dec. 28, 1976, abandoned, which is a continuation of Ser. No. 451,205, Mar. 14, 1971, abandoned.

[30] Foreign Application Priority Data

Mar. 19, 1973 [GB] United Kingdom ............... 13174/73

[51] Int. Cl.³ .................. C09C 1/42; B03B 1/04; B03D 3/06
[52] U.S. Cl. ........................................ 209/5; 209/207; 209/12; 209/162; 209/171; 252/61
[58] Field of Search ............... 252/61; 209/5, 12, 162, 209/171, 207

[56] References Cited

U.S. PATENT DOCUMENTS 3,432,030 3/1969 Olivier .................................... 209/5

FOREIGN PATENT DOCUMENTS 1222508 2/1971 United Kingdom .

Primary Examiner—John D. Smith
Attorney, Agent, or Firm—Armstrong, Nikaido, Marmelstein & Kubovcik

[57] ABSTRACT

There is described a process for separating from a mixture of mineral components at least one of the components. The process comprises the steps of (a) dispersing the mixture of mineral components in water so as to form an aqueous suspension containing said mixture of mineral components, (b) mixing together said aqueous suspension and a non-polar organic liquid in which there has been dissolved or suspended an anionic collector for at least one of the components of the mixture of mineral components, the volume ratio of said aqueous suspension to non-polar organic liquid being controlled and the conditions under which said aqueous suspension and non-polar organic liquid are mixed together being such that only a small amount of energy is dissipated therein in a short time in order to effect the mixing together thereof and one liquid is uniformly dispersed in the other but a stable emulsion is not formed and (c) thereafter separating, or allowing to separate, the two liquid phases.

14 Claims, 3 Drawing Figures

TREATMENT OF MINERALS

This is a continuation of application Ser. No. 875,382, filed Feb. 6, 1978 abandoned which was a continuation of Ser. No. 754,952 filed Dec. 28, 1976 abandoned which was a continuation of Ser. No. 451,205 filed Mar. 14, 1971 abandoned.

BACKGROUND OF THE INVENTION

This invention relates to the treatment of minerals and is concerned with a process for the separation of one or more components of a mixture of mineral components from the other components and, more particularly but not exclusively, is concerned with a process for separating from crude kaolinitic clay minerals components present therein as impurities.

It is well known to separate impurities from crude minerals by froth flotation processes. Generally in a froth flotation process an aqueous slurry of the crude mineral is treated with a reagent (known as a collector) which is selectively adsorbed onto the impurities (which it is desired to separate from the desired mineral) and which gives the impurities a hydrophobic surface; examples of commonly used collectors are oleic acid, long chain amines and suphonated petroleum hydrocarbons. The reagentised crude mineral slurry thus produced is the agitated in the presence of air and a froth is formed, and the impurities, which now have a hydrophobic surface, enter the air/water interface existing between bubbles of air and the aqueous medium. When a bubble of air rises to the surface of the reagentised crude mineral slurry the impurity goes with it. The froth appearing at the surface of the reagentised crude mineral slurry can then be removed and separation of the impurities from the mineral may thus be achieved. However, with fine minerals, i.e. minerals composed predominantly of particles smaller than about 50 microns, such as the clay minerals, separation of impurities by a froth flotation process is not very efficient and is difficult to achieve. Consequently, there have been devised other types of process for separating impurities from fine minerals: and one type include the steps of (a) adding to an aqueous slurry of the crude mineral a hydrophobic collector for the impurities in the crude mineral and (b) mixing the slurry of crude mineral containing the collector with an organic liquid which is immiscible with water whereby the impurities, which have adsorbed thereon the hydrophobic collector, are selectively extracted by the organic liquid leaving the purified mineral in the aqueous phase. Two processes of this type are described in U.S. Pat. No. 3,432,030 and in British Patent Specification No. 1,222,508. We have found, however, that such processes may be very sensitive to changes in the conditions employed and unless these are closely controlled satisfactory separations and yields are not readily obtained.

SUMMARY OF THE INVENTION

According to the present invention there is provided a process for separating from a mixture of mineral components at least one of the components which process comprises the steps of (a) dispersing the mixture of mineral components in water so as to form an aqueous suspension containing from 10% to 60% by weight of said mixture of mineral components, (b) mixing together said aqueous suspension and a non-polar organic liquid in which there has been dissolved or suspended an anionic collector for at least one of the components of the mixture of mineral components, the volume ratio of said aqueous suspension to non-polar organic liquid being in the range 1:1 to 9:1 and the conditions under which said aqueous suspension and non-polar organic liquid are mixed together being such that (i) the total amount of energy dissipated therein in order to effect the mixing together thereof lies in the range $3 \times 10^4$ to $30 \times 10^4$ joules per kg of the dry mixture of mineral components and the total time taken to dissipate said energy in the mixture does not exceed 8 minutes and (ii) one liquid is uniformly dispersed in the other but a stable emulsion is not formed, whereby at least one component of the mixture of mineral components becomes concentrated in the interface between the non-polar organic liquid phase and the aqueous liquid phase and the remaining component(s) become concentrated in the aqueous liquid phase, and (c) thereafter separating, or allowing to separate, the two liquid phases.

DESCRIPTION OF THE PREFERRED EMBODIMENTS

Figure 1:
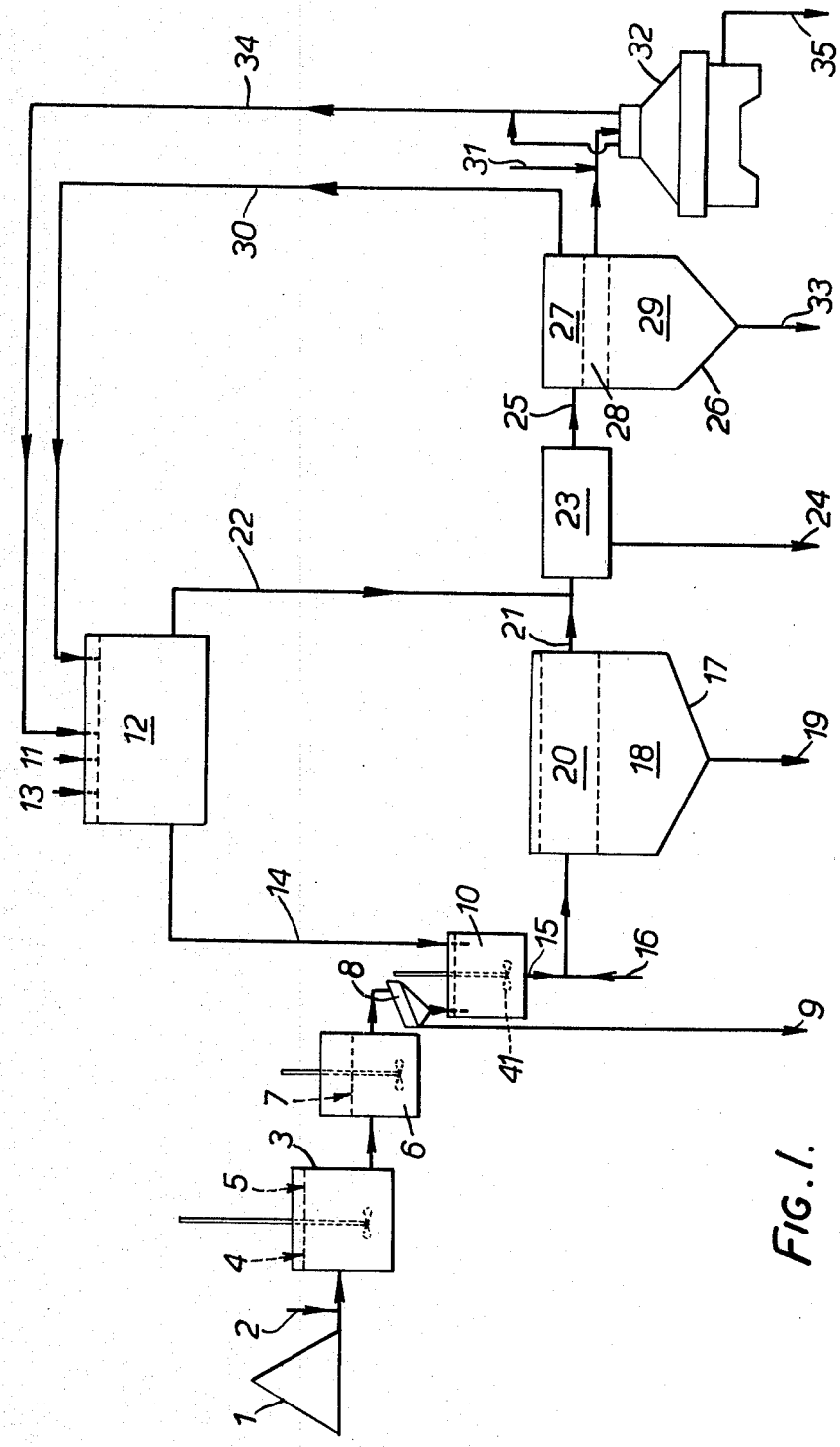

In step (a) of the process according to the invention, dispersion of the mixture of mineral components in water may be assisted by the use of one or more deflocculating agents. The most effective deflocculating agent depends on the mixture of mineral components being separated. Some minerals can be deflocculated by changing the pH. It is generally advantageous for the pH of the aqueous suspension to be at least 8.0.

The process of the present invention has been found to be especially useful in separating mineral impurities from crude kaolinitic clay minerals. When the process of the present invention is used to separate mineral impurities from a kaolinitic clay mineral, ammonia is advantageously added to the water in order to ensure that the pH of the suspension is at least 8.0. It is possible to replace the ammonia with another base, for example sodium hydroxide, potassium hydroxide, sodium carbonate or potassium carbonate. For kaolinitic clay minerals the deflocculating agent used can be a sodium silicate or certain water-soluble organic macromolecular materials having number average molecular weights in the range 700 to 10,000. Examples of this latter type of material are the water-soluble salts of poly (acrylic acid) and poly (methacrylic acid); water-soluble copolymers of which from 30 to 95 molar percent of the repeating units have the general formula

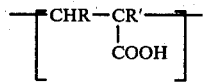

where R is hydrogen, a lower alkyl group, a carboxylic acid group or a lower alkyl carboxylate (—COOAlk) group and R' is hydrogen or a lower alkyl group and from 70 to 5 molar percent of the repeating units have the general formula

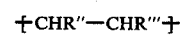

where R" is hydrogen or a lower alkyl group and R''' is chlorine a lower alkyl carboxylate (—COOAlk) group or a phenyl or substituted phenyl group; and the water-soluble salts of said copolymers. But the condensed polyphosphates, which are the deflocculating agents conventionally used in the processing of kaolinitic clay minerals, are not suitable deflocculating agents for use in treating kaolinitic clay minerals by the process according to the present invention.

A preferred procedure for carrying out step (a) when treating kaolinitic clay minerals is to dissolve in the aqueous medium, in which the clay mineral is to be dispersed, ammonia in an amount which is in the range 0.2 to 5.0 grams per kilogram of dry crude kaolinitic clay mineral, and a sodium silicate deflocculating agent in an amount which is in the range 0.2 to 10.0 grams per kilogram of dry crude kaolinitic clay, the total amount of ammonia and sodium silicate being such as to give a pH of at least 8.0. Thereafter a quantity of the clay mineral is dispersed in the aqueous medium such that the solids content of the resulting suspension is in the range of from 10% to 60% by weight.

In step (b) of the process of the invention, the aqueous suspension of the mixture of mineral components advantageously has, or is diluted so as to have, a solids content in the range 10% to 30% by weight. If the process is to be operated as a continuous process, i.e. one in which the mixing and subsequent separation of the two liquid phases is performed continuously, it has been found to be necessary from the aqueous suspension to have a solids content not greater than about 20% and it is preferably in the range 10% to 18% by weight. The non-polar organic liquid preferably has a different specific gravity from the aqueous suspension and is substantially immiscible therewith, its solubility in the aqueous phase preferably being less than 1% by weight at 25° C. Suitable organic liquids are hydrocarbons and halogenated hydrocarbons, for example kerosene, petroleum spirit, benzene, dichloreothane, carbon tetrachloride and tetrabromeothane; kerosene is generally preferred on account of its cheapness.

The most satisfactory anionic collector will depend on the nature of the components of the mixture of mineral components; for example, when treating kaolinitic clay minerals the anionic collector can be a fatty acid or a soap having from 10 to 20 carbon atoms in the hydrocarbon chain, oleic acid being preferred on account of its cheapness and ready availability, but with other mixtures of mineral components it may be more appropriate to use sulphonated petroleum hydrocarbons of the green acid type or a salt or soap of such an acid. It has generally been found that satisfactory results are obtained if the quantity of anionic collector used is in the range of from 0.5 g to 2.0 g of collector per kilogram of the dry mixture of mineral components. The two liquids, i.e. the aqueous suspension and non-polar organic liquid, are mixed together so that the volume ratio of the aqueous suspension to the non-polar organic liquid is in the range of from 1:1 to 9:1, preferably from 1:1 to 6:1; most preferably about 2:1. The mixing of the two liquids is conveniently preformed in an in-line mixer, i.e. a mixer in which an impeller, for example, operates in a flowing stream of slurry, there being a continuous flow of slurry into the mixer and a continuous equal flow of slurry out of the mixer. A suitable in-line mixer is one provided with a turbine impeller rotating at a speed in the range 500–2500 r.p.m. and with a peripheral speed in the range 200 to 1200 meters/min. Various types of impeller may be used. Alternatively, the mixing of the two liquids may be performed batchwise. In any event, the amount of energy dissipated in the two liquids during the mixing together thereof should lie in the range $3 \times 10^4$ to $30 \times 10^4$ joules per kg of the dry mixture of mineral components, and the time taken to dissipate this energy in the mixture of two liquids should not exceed 8 minutes and is advantageously in the range 2–6 minutes; in general it has been found to be better to dissipate the required amount of energy in the mixture in as short a time as possible provided always that a stable emulsion is not thereby formed. The optimum conditions within the above ranges for a particular process can be determined experimentally.

In step (c) of the process according to the invention, further water is preferably added to the mixture of the aqueous suspension and non-polar organic liquid as it leaves the mixer. When using an in-line mixer, it has been found advantageous to add clean water at a volumetric rate approximately equal to the volumetric rate of addition of the aqueous suspension to the in-line mixer. The two liquid phases can be allowed to separate either continuously or batchwise. The aqueous phase which contains the purified mineral may, if desired, be subjected to one or more further separation stages to allow any entrained non-polar organic liquid to separate. Further additions of clean water may be made before each of the further separation stages. When the organic liquid has a lower specific gravity than the aqueous suspension, the organic liquid is allowed to overflow and the suspended solids can be removed therefrom by filtration or centrifugal sedimentation. The organic liquids may be washed one or more times with further quantities of clean water to extract a further quantity of purified mineral from the solids held in suspension in the organic liquid. If it is required to recover substantially pure non-polar organic liquid which is free of suspended solids, and this is generally essential if the process is to be run continuously on a commercial scale, it has been found to be desirable to separate the solids which may be either impurities or the desired product by centrifugal separation using a centrifuge having a peripheral centrifugal acceleration which is at least 4,000 times the acceleration due to gravity (i.e. 4,000 g). A suitable type of centrifuge for this purpose is the disc centrifuge, examples of which are described in "The Chemical Engineers' Handbook," 5th Edition, by R. H. Perry and C. H. Chilton, published by the McGraw-Hill Book Company, New York, in 1973, at pages 19–90 to 19–91.

Figure 2:
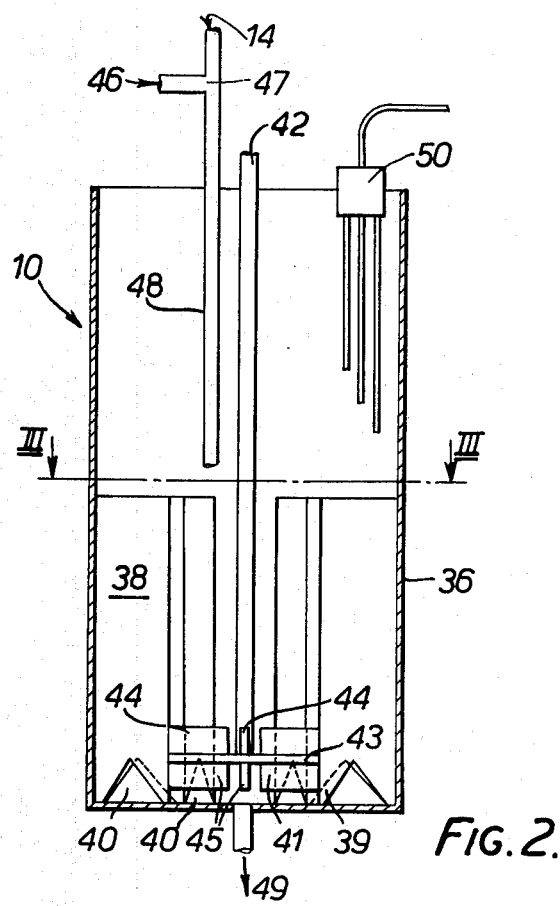
Figure 3:
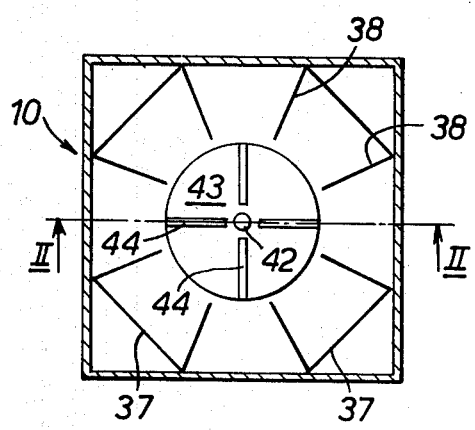

For a better understanding of the invention, and to show more clearly how the same may be carried into effect, reference will now be made, by way of example, to the accompanying drawings in which:

FIG. 1 shows diagrammatically an installation suitable for carrying out the process of the invention with a kaolinitic clay mineral; and FIGS. 2 and 3 show a sectional side elevation and a sectional plan view respectively of part of the installation shown in FIG. 1.

Dry or substantially dry crude, or raw, kaolinitic clay mineral from a stockpile 1 and water which is added at 2 are conveyed to a mixing tank 3 to which a base such as ammonia is added at 4 and a deflocculating agent such as sodium silicate, is added at 5. The materials are thoroughly mixed in the tank to form an aqueous suspension which is then passed to a second mixing tank 6 where it is diluted to the required solids content with water added at 7. The aqueous suspension is passed through a No. 300 mesh British Standard sieve (nominal aperture 53 μm) and any coarse residue which is retained on the sieve is discharged at 9. The sieved suspension enters an in-line mixer 10 of the type described hereinafter. A clean non-polar organic liquid, such as kerosene, is supplied when necessary at 11 to a reservoir 12 and a collector, such as oleic acid, is supplied to the reservoir at 13. The non-polar organic liquid containing the collector is supplied to the mixer 10 through a conduit 14. The required amount of energy is dissipated in the mixture over a period of not more than 8 minutes whereafter the mixture of aqueous suspension and non-polar organic liquid leaves the mixer 10 through a conduit 15. Clean water is added at 16 to aid the separation of the two liquid phases. A preliminary separation of the phases occurs in a first separating vessel 17, and the bottom layer 18 comprising an aqueous suspension of purified kaolinitic clay is withdrawn at 19 as the first product. The upper layer 20 which comprises a dispersion of non-polar organic liquid and solid particles in an aqueous medium passes through a conduit 21 where it is thoroughly mixed with additional non-polar organic liquid which is supplied from reservoir 12 through a conduit 22, to a scroll-type centrifuge 23. The scroll-type centrifuge separates the mixture into a thick suspension of relatively coarse kaolinitic clay together with some impurities which are withdrawn at 24 as the second product, and a dilute suspension comprising a mixture of non-polar organic liquid, water and solid particles. This latter mixture passes through a conduit 25 into a second separating vessel 26 in which the mixture separates into a top layer 27 consisting of substantially clean non-polar organic liquid, a middle layer 28 comprising a mixture of water, non-polar organic liquid and solid particles (predominantly impurities), and a bottom layer 29 comprising an aqueous suspension of substantially pure fine kaolinitic clay particles. The clean non-polar organic liquid top layer is passed through a conduit 30 to the reservoir 12 and the bottom layer is discharged at 33 at the third product. The middle layer is optionally treated with a mineral acid at 31 to give an acid pH and then fed to a disc-type centrifuge 32 which is equipped with nozzles for solids discharge, and which has a peripheral centrifugal acceleration of 6000 g. The disc-type centrifuge separates the middle layer into an overflow fraction of substantially clean non-polar organic liquid which is pumped through a conduit 34 to the reservoir 12 and an underflow fraction, which comprises an aqueous slurry consisting predominantly of separated impurity particles and is discharged at 33 as waste.

Depending on whether the quality of the product or the overall recovery of kaolinitic clay is the more important consideration, some or all of the third product, or even of the second product, may be mixed with the first product. Any remaining second or third product may be re-treated in a separate process or discarded as waste.

Referring now to FIGS. 2 and 3, the mixer 10 comprises a box 36 of square cross section having a flat plate 37 fixed across each of the four corners perpendicular to the bottom of the box to define an inner compartment of octagonal cross section. A baffle 38 extending radially inwards towards the central verticle axis of the box is provided at each of the eight angles of the octagon. In order to promote circulation of liquid throughout the box V-notches 39 are provided at the base of each of the plates 37 and V-notches 40 are provided at the base of each of baffles 38. An impeller 41 comprises a vertical shaft 42 carrying at its lower end a horizontal disc 43 to which are attached four blades 44 on the upper surface and four blades 45 on the lower surface, the blades being equally spaced on the disc. The overall width of the box is 30 cm, the diameter of the impeller disc is 15 cm, the height of each of the eight impeller blades is 2.5 cm, and the clearance between the tips of the baffles and the impeller is 0.25 cm. The impeller is driven by a 5 H.P. electric motor (not shown). The aqeous suspension flowing along a conduit 46 and the non-polar organic liquid flowing along conduit 14 are combined at a T-piece 47 and enter the mixer 10 via a conduit 48. The mixture leaves the mixer 10 through a conduit 49 which passes into the box beneath the impeller. The depth of the liquid mixture in the mixer 10 can be monitored by a level monitoring and control device 50.

The invention is further illustrated by the following Examples.

EXAMPLE 1

There was treated in this Example a coarse residue English china clay (which is a kaolinitic clay mineral) having a particle size distribution such that 26% by weight thereof consisted of particles smaller than 2 microns equivalent spherical diameter and 19% by weight consisted of particles larger than 10 microns equovalent spherical diameter. The clay was dispersed in water, containing 0.67 g. of ammonia and 1.12 g. of sodium silicate per kg. of dry crude china clay, to form a suspension having a solids content of about 15% by weight. The pH of the suspension was 9.5.

The suspension was then fed at the rate of 400 ml per minute to an in-line mixer provided with a turbine impeller which was rotated at a speed of 1250 r.p.m. Simultaneously, kerosene to which oleic acid had been added was fed to the same in-line mixer at a rate of 200 ml per minute. The amount of oleic acid added to the kerosene was such as to provide 1.12 g thereof per kg of dry china clay to be treated. The residence time of the two liquids in the mixer was 4 minutes and the energy dissipated in the liquids during the mixing thereof was in the range $3 \times 10^4$ to $30 \times 10^4$ joules per kg of dry, crude china clay.

At the exit from the in-line mixer more water was added to the mixture at the rate of 300 ml of water per minute. The mixture was then passed to a first separating vessel which had a volume of 8.1 liters. Separation occurred in this vessel and the interface between the aqueous suspension and the kerosene was maintained by adjusting the exit flows at a rate such that from 80% to 85% of the volume of the separating vessel was occupied by the aqueous suspension and 15% to 20% by the kerosene. The aqueous suspension was withdrawn, as the first stage product, through a valve at the bottom of the first separating vessel and the kerosene overflowed and passed to a second separating vessel having a volume of 4.6 liters. Before the kerosene entered the second separating vessel more water was added thereto at the rate of 300 ml of water per minute. The flows from the second separating vessel were again adjusted so that 80-85% of the volume was occupied by the aqueous suspension. The kerosene which overflowed from the second separating vessel was passed through a scroll-type centrifuge of bowl diameter 150 mm. to remove the suspended solids which were discarded as waste. The kerosene containing oleic acid in solution was recycled with a further addition of oleic acid if necessary. The underflow from the second separating vessel which constituted the second stage product was added to the first stage product.

The clay in the mixture of first and second stage products was examined for reflectance to light of 458 and 574 nm. wavelength, and the overall recovery of clay from the two separation stages was estimated. The results obtained are shown in Table 1 below

TABLE 1

|  | % recovery of clay | % reflectance to light of wavelength | |
|---|---|---|---|
|  |  | 458 nm. | 574 nm |
| Original crude china clay | — | 79.0 | 82.7 |
| Treated china clay | 73.0 | 84.1 | 89.3 |

EXAMPLE 2

There was treated in this Example a coarse residue English china clay having a particle size distribution such that 35% by weight consisted of particles smaller than 2 microns equivalent spherical diameter and 19% by weight consisted of particles larger than 10 microns equivalent spherical diameter. The crude clay gave a value for the reflectance to light of wavelength 458 nm. of 78.9% and a value for the reflectance to light of wavelength 574 nm. of 83.0%. The clay was mixed with water containing sufficient ammonia to raise the pH to 9.5 in an amount such that the solids content of the resulting suspension was 50% by weight. The mixture was agitated for one minute and then separated into four batches A, B, C and D.

Two batches, A and B, were conditioned with oleic acid in quantities of 1.1 g. and 1.4 g. per kg of dry clay respectively, the conditioning time in each case being eight minutes. Each of these two batches was then diluted to a specific gravity of 1.155 (about 22% by weight of solids), and then mixed with kerosene in the proportions two parts by volume of conditioned aqueous suspension to one part by volume of kerosene. The mixer was provided with a turbine impeller which was rotated at a speed of 1250 r.p.m. and the mixing time was four minutes. The separation of the two liquids for each batch was performed in a separating flask, three minutes being the time allowed for the separation.

The other two batches, C and D, were diluted to a specific gravity of 1.155 and were then each mixed with kerosene. The kerosene mixed with Batch C contained 1.1 g of oleic acid per kg of dry clay to be treated, and the kerosene mixed with Batch D contained 1.4 g of oleic acid per kg of dry clay to be treated. The mixing and separating steps were performed exactly as described above for the first two batches.

For each of the four batches, the energy dissipated in the two liquids during the mixing thereof was in the range $3 \times 10^4$ to $30 \times 10^4$ joules per kg of dry crude china clay. In each ase the clay in the aqueous layer was examined for brightness and the recovery of clay was estimated. The results obtained are shown in Table II below

TABLE II

| Batch | % recovery of clay | % reflectance to light of wavelength | |
|---|---|---|---|
|  |  | 458 nm. | 574 nm. |
| 1.1 g/kg. oleic acid in aqueous layer - Batch A | 68.7 | 81.5 | 85.9 |
| 1.4 g/kg. oleic acid in aqueous layer - Batch B | 67.6 | 80.4 | 84.9 |
| 1.1 k/kg. oleic acid in kerosene - Batch C | 69.4 | 82.0 | 86.6 |
| 1.4 g/kg. oleic acid in kerosene - Batch D | 67.9 | 82.0 | 86.4 |

The results show that a higher brightness and better recovery of clay are obtained if the oleic acid is incorporated in the kerosene rather than being mixed with the aqueous suspension of clay before the kerosene is added.

EXAMPLE 3

Two batches E & F of the same china clay as was used in Example 2 were treated in the following manner:

The first batch E was mixed with water containing 1.16 g. of ammonia per kg. of dry clay and no sodium silicate to form a suspension having a solids content of 50% by weight, and a pH of 9.5. The mixing time was one minute. The usupension was diluted with water to give a specific gravity of 1.100 (approximately 15% by weight of solids) and was then mixed with kerosene in which there had been dissolved 1.12 g. of oleic acid per kilogram of dry crude clay, the liquids being mixed in the properties 2 parts by volume of aqueous clay suspension to 1 part by volume of oleic acid-containing kerosene. The mixer was provided with a turbine impeller which rotated at 1250 r.p.m. and the mixing time was 4 minutes. The energy dissipated in the two liquids during the mixing thereof was in the range $3 \times 10^4$ to $30 \times 10^4$ joules per kg of dry crude china clay. The two liquids were then allowed to separate for three minutes in a separating flask before the lower aqueous layer was run off.

The second batch F of clay was treated in an exactly similar manner except that it was initially slurried with water containing 0.67 g. of ammonia and 1.12 g of sodium silicate per kilogram of dry clay. The solids content was again 50% by weight and the pH 9.5.

In each case the clay in the aqueous layer was examined for brightness and the recovery of clay estimated. The results are shown in Table III below

TABLE III

|  | % recovery of clay | % reflectance to light of wavelength | |
|---|---|---|---|
|  |  | 458 nm | 574 nm. |
| Untreated clay | — | 78.9 | 83.0 |
| Ammonia only | 65.8 | 81.5 | 85.6 |
| Ammonia and sodium silicate | 73.9 | 83.1 | 88.0 |

These results show that the recovery of clay and the brightness of the product are improved when ammonia and sodium silicate are used.

EXAMPLE 4

A fine, crude kaolin clay from North East Georgia, U.S.A. having a particle size distribution such that 81% by weight consisted of particles smaller than 2 microns equivalent spherical diameter and 7% by weight consisted of particles larger than 10 microns equivalent spherical diameter, was dispersed in water containing 2.5 g. of ammonia and 3.1 g. of sodium silicate per kg. of dry kaolin clay to form a suspension having a solids content of about 36% by weight. The pH of the suspension was 9.5, the residence time of the mixture in the dispersion stage was 40 minutes and the mixing apparatus was provided with an impeller which rotated at 1400 r.p.m.

The suspension formed as described above was then diluted with water to a solids content of 21% by weight. The diluted suspension was fed to a mixer to which there was also fed simultaneously kerosene in which there had been dissolved oleic acid in an amount equivalent to 1.3 g per kilogram of dry crude kaolin clay. The flow rate of the aqueous suspension into the mixer was 3.43 liters per minute and the flow rate of the kerosene into the mixer was 1.71 liters per minute. The throughput of dry kaolin clay was therefore 0.83 kg per minute.

The mixer used was constructed in the manner shown in and described with reference to FIGS. 2 and 3 of the accompanying drawings.

The two liquids had an average residence time in the mixer, calculated from the flow rates and the volume occupied by the liquids in the mixer, of 4 minutes, the speed of the impeller being 800 r.p.m. The energy dissipated in the liquids calculated from the product of the volts and amps drawn by the electric motor (i.e. ignoring the power factor of the motor and the energy lost in transmission) was $11.5 \times 10^4$ joules per kg. of dry kaolin clay. Water was added to the mixture as it left the mixer in the proportion of 2 parts by volume of water to 3 parts by volume of mixed liquids.

The mixture was then allowed to stand for 24 hours until substantially complete separation of the aqueous and kerosene phases had occurred. The aqueous phase containing the kaolin was removed and sampled, the remainder being subjected to gravitational sedimentation for a time which, it was calculated, would be sufficient for all particles coarser than 3 microns equivalent spherical diameter to sediment. The fine kaolin remaining in suspension was bleached with 4.45 g of sodium dithionite per kg. of kaolin at 35° C. and pH 3 to provide the final product.

The original clay was also subjected to gravitational sedimentation as described above and the fine fraction comprising particles smaller than 3 microns equivalent spherical diameter was bleached in a similar way. All four samples were tested for reflectance to light of wavelength 458 nm and to light of wavelength 574 nm and for $TiO_2$ content. The overall recovery of kaolin in the aqueous layer and the recovery of particles smaller than 3 microns equivalent spherical diameter were also estimated. The results are shown in Table IV below.

TABLE IV

|  | % recovery of kaolin | % reflectance to light of wavelength | | % by weight $TiO_2$ |
|---|---|---|---|---|
|  |  | 458 nm. | 574 nm. |  |
| Untreated kaolin | — | 85.4 | 91.5 | 1.58 |
| Untreated kaolin - smaller than 3 μm (bleached) | — | 89.1 | 93.9 | 1.56 |
| Treated kaolin | 58 | 91.4 | 95.0 | 0.59 |
| Treated kaolin - smaller than 3 μm (bleached) | 64 | 92.8 | 94.7 | 0.57 |

EXAMPLE 5

A fine crude kaolin clay from North East Georgia, U.S.A. having a particle size distribution such that 86% by weight consisted of particles smaller than 2 microns equivalent spherical diameter and 7% by weight consisted of particles larger than 10 microns equivalent spherical diameter, was dispersed in water containing 2.5 g of ammonia and 3.1 g of sodium silicate per Kg. of dry kaolin clay to form a suspension having a solids content of about 36% by weight. The residence time of the mixture in the dispersion stage and the speed of the impeller were such that $10.6 \times 10^4$ joules of energy per Kg of dry clay were dissipated in the suspension.

The suspension was then diluted with water to a solids content of 21% by weight and the diluted suspension was divided into five portions. Each portion was fed to the mixer described in Example 4, together with kerosene in which there had been dissolved oleic acid in an amount equivalent to 1.3 g per kilogram of dry crude kaolin clay. In each case the flow rate of the aqueous suspension into the mixer was 3.43 liters per minute and the flow rate of the kerosene into the mixer was 1.71 liters per minute. The throughput of dry kaolin clay was therefore 0.83 Kg per minute. Each portion was subjected to a different combination of average residence time in the mixer and impeller speed, and in each case the energy dissipated in the suspension was calculated from the product of the volts and amps drawn by the electric motor. In each case water was added to the mixture as it left the mixer in the proportion of 2 parts by volume of water to 3 parts by volume of mixed liquids.

Each mixture was then allowed to stand for 24 hours until substantially complete separation of the aqueous and kerosene phases had occurred. The aqueous phase containing the kaolin was removed and sampled, the product kaolin being tested for reflectance to light of wavelength 458 nm. and to light of wavelength 574 nm. and for $TiO_2$ content. The overall percentage recovery of kaolin in the aqueous layer was also estimated. The results are shown in Table V below.

TABLE V

| Portion No. | 1 | 2 | 3 | 4 | 5 | Original kaolin |
|---|---|---|---|---|---|---|
| Mixing time, (min.) | 4 | 4 | 4 | 6 | 6 |  |
| Impeller speed, (r.p.m.) | 600 | 700 | 800 | 600 | 700 |  |
| Energy dissipated (J $Kg^{-1} \times 10^4$) | 7.5 | 9.0 | 10.9 | 8.5 | 9.5 |  |
| Reflectance to light of wavelength: |  |  |  |  |  |  |
| 458 nm. | 89.8 | 90.6 | 91.4 | 88.8 | 89.2 | 86.0 |
| 574 nm. | 93.9 | 94.5 | 95.0 | 93.8 | 94.2 | 91.6 |
| % by wt. $TiO_2$ | 0.92 | 0.70 | 0.54 | 1.22 | 1.00 | 1.62 |
| % recovery | 60 | 58 | 58 | 52 | 48 |  |

These results show that the portions which were mixed for six minutes show lower brightness, a higher $TiO_2$ content and poorer percentage recovery than the portions which were mixed for four minutes.

EXAMPLE 6

The same crude kaolin clay as was used in Example 5 was dispersed in water using the same method as described in Example 5 except that the amount of sodium silicate was 6.2 g per Kg. of dry kaolin clay.

The suspension thus formed was then diluted with water to a solids content of 21% by weight and the diluted suspension was divided into four portions. Each portion was fed to the mixer described in Example 4 together with kerosene in which there had been dissolved oleic acid in an amount equivalent to 1.3 g per kilogram of dry crude kaolin clay. The flow rates of the aqueous suspension and the kerosene were the same as in Example 5. Each portion was mixed for an average residence time in the mixer of 4 minutes, the speed of the impeller being different for each portion, and the energy dissipated in the suspension was calculated from the product of the volts and amps drawn by the electric motor. In each case water was added to the mixture as it left the mixer in the proportion of 2 parts by volume of water to 3 parts by volume of mixed liquids.

Each mixture was then allowed to stand for 24 hours until substantially complete separation of the aqueous and kerosene phases had occurred. The aqueous phase containing the kaolin was removed and sampled, the product kaolin being tested for reflectance to light of wavelength 458 nm. and to light of wavelength 574 nm. and for $TiO_2$ content. The overall percentage recovery of kaolin in the aqueous layer was also estimated. The results are shown in Table VI below.

TABLE VI

| Portion No. | 1 | 2 | 3 | 4 | Original Kaolin |
|---|---|---|---|---|---|
| Impeller speed (r.p.m.) | 600 | 700 | 800 | 900 | |
| Energy dissipated ($JKg^{-1} \times 10^4$) | 6.8 | 8.9 | 10.8 | 12.7 | |
| Reflectance to light of wavelength: | | | | | |
| 458 nm | 90.1 | 90.9 | 91.2 | 91.5 | 86.0 |
| 574 nm | 94.1 | 94.6 | 94.8 | 94.6 | 91.6 |
| % by wt. $TiO_2$ | 0.90 | 0.79 | 0.69 | 0.52 | 1.62 |
| % recovery | 70 | 66 | 65 | 61 | |

EXAMPLE 7

Five samples of a crude kaolinitic clay, having a particle size distribution such that 81% by weight consisted of particles smaller than two microns equivalent spherical diameter and 7% by weight consisted of particles larger than ten microns equivalent spherical diameter, were each subjected to the process described above with reference to FIGS. 1, 2 and 3. Each batch of clay was dispersed in water containing 2.5 g. of ammonia and 3.1 g. of sodium silicate per kg. of dry clay to form a suspension having a pH of 9.5 and a solids content of about 36% by weight. Each suspension was diluted to a chosen solids content in the second mixing tank 6 by adding the appropriate amount of water and the diluted suspension passed through a No. 300 mesh B.S. sieve into the mixer 10 which was of the type described in Example 4. Kerosene was also added to the mixer in a quantity such that the volume ratio of diluted aqueous suspension to kerosene was 2.1 and there was mixed with the kerosene an amount of oleic acid equivalent to 1.3 g per kg. of dry crude kaolinitic clay. The impeller of the mixer was rotated at 800 r.p.m. and the average residence time in the mixer in each case was four minutes. Water was added to the mixture leaving the mixer in the proportion of two parts by volume of water to three parts by volume of mixed liquids. Preliminary separation of the two phases took place in the first separating vessel 17 and the lower, aqueous layer was withdrawn as the first product. An additional quantity of kerosene was added to the upper layer and a second separation was performed in the scroll-type centrifuge 23, the underflow being withdrawn as the second product and the overflow being passed to the second separating vessel 26 where three distinct layers formed. The bottom layer was withdrawn as the third product. The middle layer was treated with sulphuric acid to give a pH of 4.0 and was then retreated in the disc-type centrifuge 32 to produce an underflow which was discarded as waste and an overflow of clean kerosene. The top layer consisted of clean kerosene and was returned to the reservoir 12 together with the clean kerosene from the disc-type centrifuge. The solids content of the diluted aqueous suspension which was fed to the mixer, the amount of additional kerosene which was added to the mixture entering the the scroll-type centrifuge, the amount of energy dissipated in the mixture calculated from the product of the volts and amps drawn by the motor driving the mixer impeller and the mass throughput rate of the clay, the recoveries of kerosene and kaolinitic clay and the properties of the clay products were recorded and are set forth in Table VII below:

TABLE VII

| Solids content of aqueous suspension fed to mixer (% by wt.) | Excess kerosene addition (% by vol.) | Kerosene recovery (% by vol.) | Energy dissipated $JKg^{-1} \times 10^4$ | Product | Product recovery (% by wt.) | % reflectance of light of wavelength | | % by wt. of | |
|---|---|---|---|---|---|---|---|---|---|
| | | | | | | 458 mm. | 574 mm. | $TiO_2$ | $Fe_2O_3$ |
| | | | | Original | | 85.4 | 91.5 | 1.60 | 1.11 |
| 19 | 100 | 0 | 12.4 | Total prod. | 56 | 91.0 | 93.0 | 0.63 | 1.00 |
| 19 | 300 | 0 | 12.4 | Total prod. | 58 | 90.8 | 93.0 | 0.65 | 1.03 |
| 17 | 200 | 100 | 14.1 | Prod. 1 | 65 | 90.8 | 93.6 | 0.55 | 1.00 |
| | | | | Prod. 2 | 5 | 79.3 | 85.8 | 1.60 | 1.10 |
| | | | | Prod. 3 | 12 | 90.2 | 94.0 | 0.84 | 0.99 |
| 16 | 100 | 100 | 15.1 | Prod. 1 | 73 | 91.2 | 94.0 | 0.45 | 1.10 |
| | | | | Prod. 2 | 9 | 78.8 | 86.5 | 1.60 | 1.10 |
| | | | | Prod. 3 | 6 | 89.3 | 93.5 | 1.10 | 0.91 |
| 15 | 100 | 100 | 16.2 | Prod. 1 | 80 | 90.9 | 93.8 | 0.54 | 1.10 |
| | | | | Prod. 2 | 8 | 78.2 | 85.1 | 2.40 | 1.10 |
| | | | | Prod. 3 | 4 | 89.8 | 94.2 | 1.20 | 1.02 |

EXAMPLE 8

In a plant for purifying stontrium sulphate, or celestite there is produced, in the crushing and washing steps, a quantity of "slimes" or fine solid particles substantially all of which pass a No. 300 mesh B.S. sieve (nominal aperture 53 μm). A sample of this material, having a particle size distribution such that 26% by weight consisted of particles smaller than two microns equivalent spherical diameter and 50% by weight consisted of particles larger than ten microns equivalent spherical diameter, was dispersed in water containing 6.2 g. of sodium silicate per kg. of dry feed material to form a suspension having a solids content of about 15% by weight and a pH of 8.5.

This suspension was fed to an in-line mixer provided with a turbine impeller which was rotated at a speed of 1250 r.p.m. Simultaneously there was fed to the same in-line mixer kerosene to which had been added an anionic sulphonate collector manufactured and sold by Cyanamid Great Britain Limited under the trademark "AERO PROMOTER 801" in an amount equivalent to 0.55 g per kg. of dry feed material. The ratio of the volumetric flow rate of aqueous suspension to the volumetric flow rate of kerosene was 2:1 and the energy dissipated in the liquids during the mixing thereof was in the range $3 \times 10^4$ to $30 \times 10^4$ joules per kg. of dry feed material. At the exit from the mixer more water was added to the mixture in the ratio 2 parts by volume of water to 3 parts by volume of mixture; the mixture was then passed to a first separating vessel. Separation occurred in this vessel and the interface between the aqueous suspension and the kerosene was maintained by adjusting the exit flows to a rate such that 80% of the volume of the separating vessel was occupied by the aqueous suspension and 20% by the kerosene. The aqueous suspension containing the earthy waste material was withdrawn through a valve at the bottom of the first separating vessel and the interface between the aqueous suspension and the kerosene was maintained by adjusting the exit flows to a rate such that the aqueous suspension and 20% by the kerosene. The aqueous suspension containing the earthy waste material was withdrawn through a valve at the bottom of the first separating vessel, the solids concentrated by gravitational sedimentation and discarded as waste. The kerosene containing the celestite concentrate overflowed and passed to a second separating vessel. Before the kerosene entered the second separating vessel an equal volume of water was added thereto. The flows from the second separating vessel were again adjusted so that 80% of the volume was occupied by the aqueous suspension. The celestite-laden kerosene which overflowed from the second separating vessel was passed into a disc-type centrifuge which had a peripheral centrifugal acceleration of 6000 g in order to separate clean kerosene from a mixture of celestite and water. The kerosene containing dissolved collector was recycled with a further addition of collector to maintain the correct concentration. The celestite concentrate was then filtered and dried and examined for the percentage by weight of strontium sulphate, silica and ferric oxide. The results are shown in Table VIII below:

TABLE VIII

| | % by weight of the feed material | % by weight recovery of celestite | SrSO$_4$ | SiO$_2$ | Fe$_2$O$_3$ |
|---|---|---|---|---|---|
| Feed material | 100 | 100 | 29.7 | 39.0 | 18.4 |
| Celestite concentrate | 24 | 84 | 89.1 | 3.6 | 0.83 |
| Waste | 76 | 16 | 10.9 | 50.2 | 20.0 |

EXAMPLE 9

"Slimes" are also produced during the preliminary extraction step in a process for mining celestite and this material is generally more finely divided than the material which is described in Example 8. A sample of fine celestite slimes, having a particle size distribution such that 85% by weight consisted of particles smaller than two microns equivalent spherical diameter and 10% by weight consisted of particles larger than ten microns equivalent spherical diameter, was dispersed in water containing 6.2 g. of sodium silicate per kg. of dry feed material to form a suspension having a solids content of about 15% by weight and a pH of 8.5.

This suspension was fed to a mixer of the type illustrated in and described with reference to FIGS. 2 and 3 of the accompanying drawings which was provided with a turbine impeller which was rotated at 800 r.p.m. Simultaneously there was fed to the same mixer kerosene to which had been added the same anionic collector as was used in Example 8 in an amount equivalent to 0.55 g. per kg. of dry feed material. The ratio of the volumetric flow rate of aqueous suspension to the volumetric rate of kerosene was 2:1. The residence time in the mixer was four minutes and the energy dissipated in the liquids during the mixing thereof was in the range $3 \times 10^4$ to $30 \times 10^4$ joules per kg. of dry feed material. At the exit from the mixer more water was added to the mixture in the ratio two parts by volume of water to three parts by volume of mixture; the mixture was then passed to a first separating vessel. Preliminary separation of the phases took place in the first separating vessel and the lower, aqueous layer was withdrawn and discarded as waste. An additional quantity of clean kerosene was added to the upper layer and a second separation was performed in a scroll-type centrifuge, the underflow being withdrawn as further waste and the overflow being passed to a second separating vessel where three distinct layers formed. The bottom aqueous layer was withdrawn as further waste material and the middle layer was treated with sulphuric acid to give a pH of 4.0 and retreated in the same disc-type centrifuge as was described in Example 8 to produce an underflow which contained celestite concentrate and an overflow of clean kerosene. The top layer consisted of clean kerosene and was recycled together with the clean kerosene from the disc-type centrifuge. The celestite concentrate was then filtered and dried and examined for the percentage by weight of strontium sulphate, silica and ferric oxide.

The results are shown in Table IX below:

TABLE IX

| | % by weight of the feed material | % by weight recovery of celestite | SrSO$_4$ | SiO$_2$ | Fe$_2$O$_3$ |
|---|---|---|---|---|---|
| Feed material | 100 | 100 | 2.4 | 80.2 | 12.6 |
| Celestite concentrate | 5 | 71 | 34.0 | 49.3 | 6.1 |
| Waste | 95 | 29 | 0.7 | 81.8 | 12.9 |

EXAMPLE 10

In a process for producing a ceramic flux material from a pegmatite, which consisted predominantly of quartz, felspar and, as an impurity, black tourmaline, a proportion of "slimes" or particles substantially all of which had a diameter smaller than 53 microns was produced during the milling operation. It is necessary to remove as much as possible of the black tourmaline from the pegmatite before the material can be used as a ceramic flux since the presence of the black tourmaline would seriously impair the fired brightness of any ceramic article in which the flux was used. However the slimes produced in the pegmatite refining process fail to respond to conventional methods for removing tourmaline, such as froth flotation, and the slimes have hitherto been discarded as waste with consequent loss of valuable material.

Two samples A and B of pegmatite slimes having low and high tourmaline contents respectively had similar particle size distributions such that 20% by weight consisted of particles smaller than two microns equivalent spherical diameter and 20% by weight consisted of particles larger than ten microns equivalent spherical diameter. Both samples were treated in exactly the same manner as follows.

The feed material was dispersed in water containing 0.67 g. of ammonia and 1.12 g. of sodium silicate per kg. of dry feed material to form a suspension having a pH of 9.0 and a solids content of about 15% by weight. This suspension was fed to an in-line mixer provided with a turbine impeller which was rotated at a speed of 1250 r.p.m. Simultaneously there was fed to the same in-line mixer kerosene to which had been added oleic acid in an amount equivalent to 1.12 g. per kg. of dry feed material. The ratio of the volumetric flow rate of aqueous suspension to the volumetric flow rate of kerosene was 2:1 and the energy dissipated in the liquids during the mixing thereof was in the range $3 \times 10^4$ to $30 \times 10^4$ joules per kg. of dry feed material. At the exit from the mixer more water was added to the mixture in the ratio two parts by volume of water to three parts of volume of mixture; the mixture was then passed to a first separating vessel. Separation occurred in this vessel and the interface between the aqueous suspension and the kerosene was maintained by adjusting the exit flows at a rate such that 85% of the volume was occupied by the aqueous suspension and 15% by the kerosene. The aqueous suspension was withdrawn, as the first stage product, through a valve at the bottom of the first separating vessel. Before the kerosene entered the second separating vessel and equal volume of water was added thereto. The flows from the second separating vessel were again adjusted so the 85% of the volume was occupied by the aqueous suspension. The kerosene which overflowed from the second separating vessel was passed into a disc-type centrifuge which had a peripheral centrifuge acceleration of 6000 g. in order to separate clean kerosene from a mixture of tourmaline and water. The kerosene containing oleic acid in solution was recycled with a further addition of oleic acid, if necessary, to maintain the correct concentration. The underflow from the second separating vessel which constituted the second stage product was added to the first stage product.

The pegmatite is the mixture of first and second stage products was examined for reflectance to light of 504 nm wavelength after firing to 1180° C. and for ferric oxide content (a measure of the tourmaline content) and the recovery of the product from the two separation stages was estimated. The results obtained are shown in Table X below:

TABLE X

| | Fired brightness at 1180° C. | % by wt. $Fe_2O_3$ | % by wt. recovery of feed material |
|---|---|---|---|
| Sample A | | | |
| Feed material | — | 0.35 | 100 |
| Total product | 75.2 | 0.06 | 94 |
| Sample B | | | |
| Feed material | — | 0.85 | 100 |

TABLE X-continued

| | Fired brightness at 1180° C. | % by wt. $Fe_2O_3$ | % by wt. recovery of feed material |
|---|---|---|---|
| Total product | 61.9 | 0.08 | 87 |

We claim:

1. In a process for separating from a mixture of mineral components at least one of said components, the mixture of mineral components being in the form of an aqueous suspension containing up to 60% by weight of said mixture of mineral components, the improvement which comprises:
    (a) continuously feeding said aqueous suspension to an in-line mixer positioned downstream from the point of formation of said aqueous suspension, the aqueous suspension being fed to said in-line mixer at a dilution such that the solids content thereof is not greater than about 20% by weight;
    (b) feeding to said in-line mixer, from a reservoir, a non-polar organic liquid in which there has been dissolved or suspended an anionic collector for at least one component of said mixture of mineral components, the rates of feeding said aqueous suspension and said non-polar organic liquid to said in-line mixer being such that the volume ratio of said aqueous suspension to said non-polar organic liquid is in the range of from 1:1 to 9:1;
    (c) mixing together said aqueous suspension and said non-polar organic liquid containing said ionic collector in said in-line mixer by causing said aqueous suspension and said organic liquid to flow through said in-line mixer while maintaining agitation therein, the residence time of said aqueous suspension and said organic liquid in said in-line mixer and the rate of agitation being such that:
        (i) the total energy dissipated during said mixing is in the range of from $3 \times 10^4$ to $30 \times 10^4$ joules per kg of the mixture of mineral components, calculated on a dry weight basis, and the total time taken to dissipate said energy in the mixture does not exceed 8 minutes; and
        (ii) one liquid is uniformly dispersed in the other but a stable emulsion is not formed, whereby at least said one component of the mixture of mineral components becomes concentrated at the interface between the non-polar organic liquid phase and the aqueous liquid phase, and the remaining one or more components of said mixture of mineral components becomes concentrated in the aqueous liquid phase;
    (d) discharging from the in-line mixer a mixture comprising said non-polar organic liquid phase and said aqueous liquid phase;
    (e) separating the two liquid phases discharged from the in-line mixer; and
    (f) recovering from the non-polar organic liquid phase at least a portion of said organic liquid and returning it to said reservoir for recycling in said process.

2. A process according to claim 1 wherein, in step (a), the aqueous suspension fed to said in-line mixer has a solids content in the range of from 10% to 18%.

3. A process according to claim 1 wherein said separating step (e) is effected by passing the mixture from said in-line mixer to a first separating vessel to effect a first gravity-induced separation into an aqueous phase containing a major proportion of one or more of the components of said mixture of mineral components constituting a desired product and an organic liquid-containing phase containing a major proportion of the remaining components of said mixture of mineral components constituting impurities, passing at least part of said organic liquid-containing phase formed in said first separating vessel to a second separating vessel, effecting in said second separating vessel a second gravity-induced separation into an aqueous phase containing a further quantity of said desired product and at least one additional phase containing said organic liquid, and returning organic liquid from said second separating vessel to said reservoir for said recycling.

4. A process according to claim 3 which includes admixing with the organic liquid-containing phase from said first separating vessel, before it is passed to said second separating vessel, additional organic liquid from said reservoir, passing the resulting mixed product to a centrifuge to effect separation of a further quantity of said desired product and an organic liquid-containing phase which is passed from said centrifuge to said second separating vessel.

5. A process according to claim 4 which includes separating the organic liquid-containing phase in said second separating vessel into (i) a layer comprising an aqueous suspension of said desired product, (ii) an intermediate layer including water, organic liquid and particulate impurities, and (iii) a layer of organic liquid which is substantially clean, passing said layer of substantially clean organic liquid to said reservoir, and passing said intermediate layer to a centrifuge wherein there is separated relatively clean organic liquid for return to said reservoir.

6. A process according to claim 1 wherein, in step (b), the rates of feeding the aqueous suspension and non-polar organic liquid to the in-line mixer are such that the volume ratio of aqueous suspension to non-polar organic liquid is in the range of from 1:1 to 6:1.

7. A process according to claim 1 wherein, in step (c), the time taken to dissipate the required amount of energy in the mixture of said aqueous suspension and said non-polar organic liquid is in the range of from 2 to 6 minutes.

8. A process according to claim 1 wherein the mixture of mineral components is a crude kaolinitic clay mineral and wherein the aqueous suspension containing the mixture of mineral components has a pH of at least 8.0 and has a solids content in the range of from 10% to 18% by weight.

9. A process according to claim 8 wherein dispersion of the mixture of mineral components in water is assisted by the addition to the water of one or more deflocculating agents.

10. A process according to claim 9 wherein the deflocculating agent is a sodium silicate.

11. A process according to claim 9 wherein the deflocculating agent is a water-soluble organic macromolecular material having a number average molecular weight in the range of 700 to 10,000.

12. A process according to claim 11 wherein the water-soluble organic macromolecular material is selected from the group consisting of (a) a water-soluble salt of poly (acrylic acid) or poly (methacrylic acid); (b) a water-soluble copolymer of which from 30 to 95 molar percent of the repeating units have the general formula:

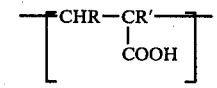

where R is hydrogen, a lower alkyl group, a carboxylic acid group or a lower alkyl carboxylate (—COOAlk) group and R' is hydrogen or a lower alkyl group and from 70 to 5 molar percent of the repeating units have the general formula:

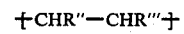

where R" is hydrogen or a lower alkyl group and R'" is selected from the group consisting of chlorine, a lower alkyl carboxylate (—COOAlk) group or a phenyl or substituted phenyl group; or (c) a water-soluble salt of said copolymer.

13. A process according to claim 1, wherein the non-polar organic liquid has a specific gravity which differs from that of the aqueous suspension and its solubility in the aqueous phase is less than 1% by weight at 25° C.

14. A process according to claim 13, wherein the non-polar organic liquid is a hydrocarbon or a halogenated hydrocarbon.

* * * * *